United States Patent
Mo et al.

(10) Patent No.: US 11,502,352 B2
(45) Date of Patent: Nov. 15, 2022

(54) THERMAL RUNAWAY SHIELD FOR SHIPPING BATTERY PACKS/CELLS

(71) Applicant: KULR TECHNOLOGY CORPORATION, Campbell, CA (US)

(72) Inventors: Michael Mo, Saratoga, CA (US); Yoshio Robert Yamaki, San Diego, CA (US); Juergen Mueller, San Diego, CA (US)

(73) Assignee: KULR TECHNOLOGY CORPORATION, San Diego, CA (US)

( * ) Notice: Subject to any disclaimer, the term of this patent is extended or adjusted under 35 U.S.C. 154(b) by 273 days.

(21) Appl. No.: 16/911,320

(22) Filed: Jun. 24, 2020

(65) Prior Publication Data
US 2020/0403195 A1    Dec. 24, 2020

Related U.S. Application Data

(60) Provisional application No. 62/865,719, filed on Jun. 24, 2019.

(51) Int. Cl.
| | |
|---|---|
| *H01M 10/00* | (2006.01) |
| *H01M 10/658* | (2014.01) |
| *H01M 50/24* | (2021.01) |
| *H01M 50/256* | (2021.01) |
| *B32B 15/09* | (2006.01) |
| *B32B 15/20* | (2006.01) |
| *B65D 30/08* | (2006.01) |
| *B65D 85/00* | (2006.01) |
| *H01M 10/0525* | (2010.01) |

(52) U.S. Cl.
CPC .......... *H01M 10/658* (2015.04); *B32B 15/09* (2013.01); *B32B 15/20* (2013.01); *B65D 29/02* (2013.01); *B65D 85/70* (2013.01); *H01M 50/24* (2021.01); *H01M 50/256* (2021.01); *B32B 2439/06* (2013.01); *H01M 10/0525* (2013.01)

(58) Field of Classification Search
CPC ...... B65D 81/38; B65D 2585/88; B65D 7/22; B65D 29/02; B32B 2439/06; B32B 15/09; H01M 50/24; H01M 10/643; H01M 10/613; H01M 10/6556
See application file for complete search history.

(56) References Cited

U.S. PATENT DOCUMENTS

| | | | | |
|---|---|---|---|---|
| 8,336,495 | B1 * | 12/2012 | Dumm | A01K 9/00 119/71 |
| 2020/0062487 | A1 * | 2/2020 | Gehlhausen | F17C 3/04 |

* cited by examiner

*Primary Examiner* — Cynthia H Kelly
*Assistant Examiner* — Monique M Wills
(74) *Attorney, Agent, or Firm* — Venture Pacific Law, PC

(57) ABSTRACT

An apparatus for shipping or storage of Li-ion batteries comprises a sealable outer bag fabricated from heat-resistant, permeable fabric, a first flexible thermal runaway shield ("TRS") fabricated from low-permeability film configured to line a first inside surface of the outer bag, a second flexible TRS fabricated from low-permeability film configured to line a second inside surface of the outer bag, and at least one Li-ion battery configured to be disposed between the first flexible TRS and the second TRS of the sealable outer bag to provide a sealed outer bag.

23 Claims, 5 Drawing Sheets

THERMAL RUNAWAY SHIELD FOR SHIPPING BATTERY PACKS/CELLS

CROSS REFERENCE

This application claims priority to a provisional patent application, entitled "Thermal Solutions for Shipping Li-Ion Battery Packs/Cells", filed on Jun. 24, 2019 and having application No. 62/865,719. Said application is incorporated herein by reference.

FIELD OF INVENTION

The present disclosure relates to thermal protection for an energy storage device and, in particular, to a thermal runaway shield for the energy storage device (e.g., a battery) to prevent thermal runaway propagation.

BACKGROUND

Lithium-Ion ("Li-Ion") 18650 cells (and other batteries) have a slight chance of spontaneously shorting, which heats the interior gradually until a separator film within the cell melts, resulting in an internal short. Consequently, an explosive release of thermal energy can be triggered. The explosion can cause an end cap of the shorted cell to rupture. A flare briefly emerges (e.g., of around 1 second) from that ruptured end cap. For a minute or so, the cell's materials combust, releasing heat and driving the shorted cell to about 500 degrees Celsius ("C") or greater.

If there are any neighboring cells that are consequently heated near or above a critical temperature (e.g., around 130° C.), the neighboring cells can also short with the same consequences causing additional explosions and ruptures; hence giving the well-known problem of thermal runaway propagation. To combat thermal runaway, Tesla, Inc. equips their Tesla's electric automobiles with an active cooling system to prevent thermal runaway propagation of their installed battery cells.

However, there is a desire to seek a passive solution suitable for battery packs of arbitrary cell sizes and shapes. Therefore, there exists a need for a novel system, method, and apparatus for preventing thermal runaway propagation for cells in an energy storage device.

SUMMARY OF INVENTION

An apparatus for shipping or storage of Li-ion batteries is disclosed. The apparatus for shipping or storage of Li-ion batteries comprises a sealable outer bag fabricated from heat-resistant, permeable fabric, a first flexible thermal runaway shield ("TRS") fabricated from low-permeability film configured to line a first inside surface of the outer bag, a second flexible TRS fabricated from low-permeability film configured to line a second inside surface of the outer bag, and at least one Li-ion battery configured to be disposed between the first flexible TRS and the second TRS of the sealable outer bag to provide a sealed outer bag.

In accordance to another aspect of the present disclosure, the first flexible TRS is configured to wrap around a first Li-ion battery, the second flexible TRS is configured to wrap around a second Li-ion battery, and the sealable outer bag is configured to wrap around the first flexible TRS and the second TRS to provide a TRS sealed battery pack.

In accordance to another aspect of the present disclosure, the sealable outer bag includes a slit on each side of the bag.

In yet another aspect of the present disclosure, the apparatus for shipping or storage of Li-ion batteries comprises a sealable flexible thermal runaway shield ("TRS") bag fabricated from low-permeability film configured to store at least one Li-ion battery, and a sealable outer bag fabricated from heat-resistant, permeable fabric configured to store the sealable flexible TRS bag.

In accordance to another aspect of the present disclosure, the flexible TRS includes a cavity to enclose elements for heat dissipation including water-based coolant.

In accordance to yet another aspect of the present disclosure, the apparatus for shipping or storage of Li-ion batteries comprises a sealable outer bag fabricated from heat-resistant, permeable fabric. a first flexible thermal runaway shield ("TRS") fabricated from low-permeability film configured to line a first inside surface of the outer bag, a second flexible TRS fabricated from low-permeability film configured to line a second inside surface of the outer bag, a rigid divider configured to separate an interior of the sealable outer bag into a first compartment and a second compartment, a first sealable flexible TRS bag fabricated from low-permeability film configured to enclose at least one Li-ion battery within a first compartment of the sealable outer bag, and a second sealable flexible TRS bag fabricated from low-permeability film configured to enclose at least one other Li-ion battery within a second compartment of the sealable outer bag.

Other advantages of the disclosed apparatus for shipping and storage of Li-ion batteries will be readily apparent from the description of the drawings and detailed description.

DESCRIPTION OF THE DRAWINGS

The foregoing and other objects, aspects, and advantages of the present disclosure can be better understood from the following detailed description of various embodiments of the present disclosure when taken in conjunction with the accompanying drawings as follows.

DETAILED DESCRIPTION OF THE EMBODIMENTS

In the following detailed description of the embodiments, reference is made to the accompanying drawings, which form a part hereof, and in which is shown by way of illustration of specific embodiments in which the present disclosure may be practiced. It is appreciated that the terms "a" or "an," as used herein, are defined as one or more than one. Also, unless stated otherwise, terms such as "first", "second", "third", etc. are used to distinguish between elements such terms describe. These terms are not necessarily intended to indicate temporal or prioritization of such elements.

Figure 1:
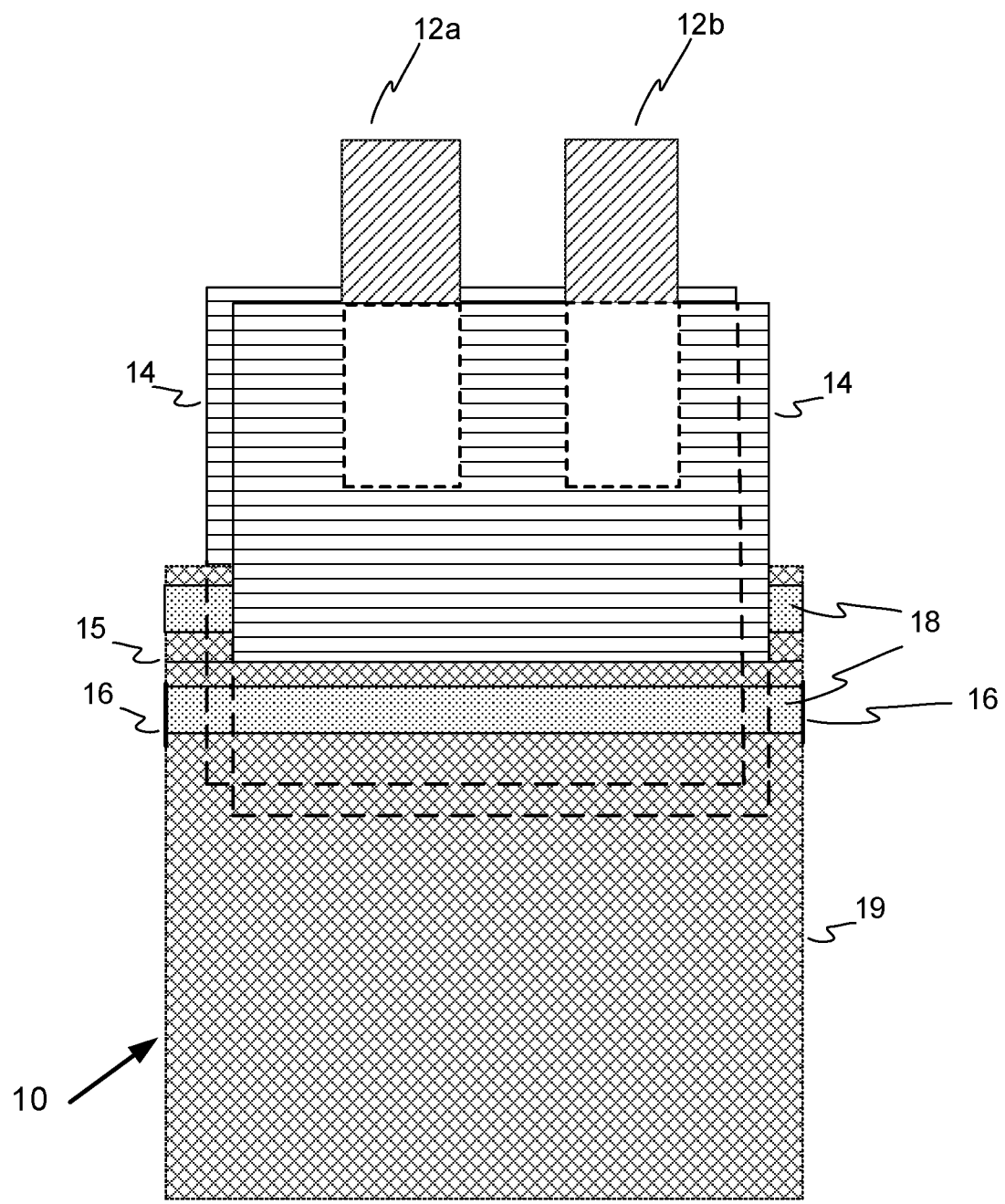
FIG. 1 illustrates a thermal runaway shield shipping package of the present disclosure.

FIG. 1 illustrates a thermal runaway shield (TRS) shipping package of the present disclosure. The thermal runaway shield shipping package 10 includes at least two TRS outer bag flat liners 14 and an outer bag 19. Two energy storage cells 12a, 12b (e.g., Li-Ion 18650 cells or other battery cells) are placed between the TRS outer bag flat liners 14 and into the outer bag 19. The TRS outer bag flat liners 14 can be fabricated from low-permeability film. For the purposes of the patent application, "low permeability film" is defined as a film incorporating an aluminum foil layer, which film exhibits a Water Vapor Transmission Rate (FED 101) of 0.0006 grams/100 sq. in./24 hrs (or similar) and an O2 Transmission Rate (MOCON) of 0.0006 cc/100 sq. in./24 hrs (or similar). In accordance to an embodiment of the present disclosure, the TRS outer bag flat liners 14 are made of polyethylene terephthalate/aluminum foil laminated film. The low-permeability film encloses additional elements for heat dissipation that can include water-based coolant, wicking mechanism to distribute coolant either in a woven or nonwoven configuration. The wicking material can be made from Nomex, Kevlar, carbon fiber veil, or other heat-resistant material. Kevlar is a trademark for an aramid fiber. Accordingly, Kevlar as used throughout the application includes aramid which is the generic term used to describe a synthetic fiber or polymer that offers high strength and temperature resistance. Examples of aramid would include the Dupont Kevlar and the Teijin product Twaron. The outer bag 19 is fabricated from heat-resistant, permeable fabric such as Nomex, Kevlar, or other heat resistant material that permits controlled release of gas from any thermal event. The outer bag 19 affords controlled release of gas but contains flame and ejecta that can be generated in a thermal runaway event. Once the two energy cells 12a, 12b are placed between the two TRS outer bag liners 14 and inserted into the outer bag 19, the outer bag 19 is a closable bag and includes a fold 15 that affords the outer bag with fastener 18 to seal at fold 15 an opening of the outer bag 19. The fastener 18 can be made of Velcro or other suitable sealing mechanism. Once sealed, the outer bag 19 can be further wrapped to form a wrapped package substantially shaped and larger than the unwrapped energy cells as the energy cells are now wrapped in the TRS outer bag liners 14 and the outer bag 19. In accordance to another embodiment of the present disclosure, slits 16 are located on the sides of the outer bag 19 to further enhance the permeability of the outer bag 19 during a thermal runaway event. The slits 16 can be fabricated from high temperature fiberglass material or other suitable material capable of withstanding high temperatures.

Figure 2:
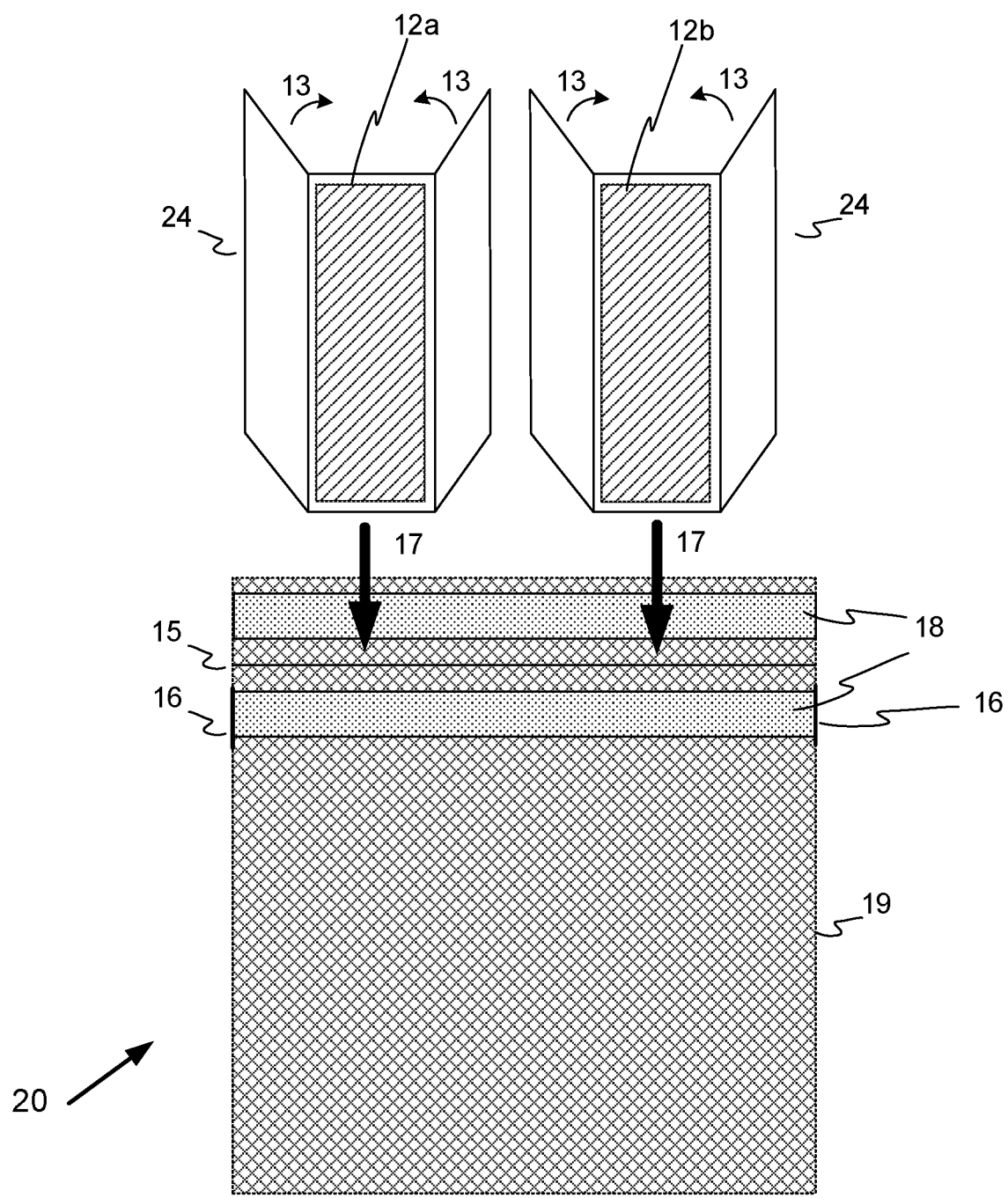
FIG. 2 illustrates another embodiment of a thermal runaway shield shipping package of the present disclosure.

FIG. 2 illustrates another embodiment of the thermal runaway shield (TRS) shipping package of the present disclosure. The thermal runaway shield shipping package 20 includes at least two TRS individual flexible wraps 24, one for each energy storage cell 12a, 12b, and an outer bag 19. The TRS outer bag flexible wraps 24 can be fabricated from low-permeability film. The low-permeability film encloses additional elements for heat dissipation that can include water-based coolant, wicking mechanism to distribute coolant either in a woven or nonwoven configuration. The wicking material can be made from Nomex, Kevlar, carbon fiber veil, or other heat-resistant material. The outer bag 19 is fabricated from heat-resistant, permeable fabric that permits controlled release of gas from any thermal event. Materials such as Nomex, Kevlar, or other heat resistant material can be used to manufacture the outer bag 19. The outer bag 19 affords controlled release of gas but contains flame and ejecta that can be generated in a thermal runaway event. The two energy cells 12a, 12b are each wrapped in a direction 13, for example, by the TRS flexible wrap 24 to form TRS wrapped cells 17, represented as arrows. In accordance to an embodiment of the present disclosure, the flexible TRS is made of polyethylene terephthalate/aluminum foil laminated film. The TRS wrapped cells 17 are placed into the outer bag 19 that is a closable bag and includes a fold 15 that affords the outer bag with fasteners 18 to seal at fold 15 an opening of the outer bag 19. The fasteners 18 can be made of Velcro or other suitable sealing mechanism. In accordance to another embodiment of the present disclosure, slits 16 are located on the sides of the outer bag 19 to further enhance the permeability of the outer bag 19 during a thermal runaway event. The slits 16 can be fabricated from high temperature fiberglass material or other suitable material capable of withstanding high temperatures.

Figure 3:
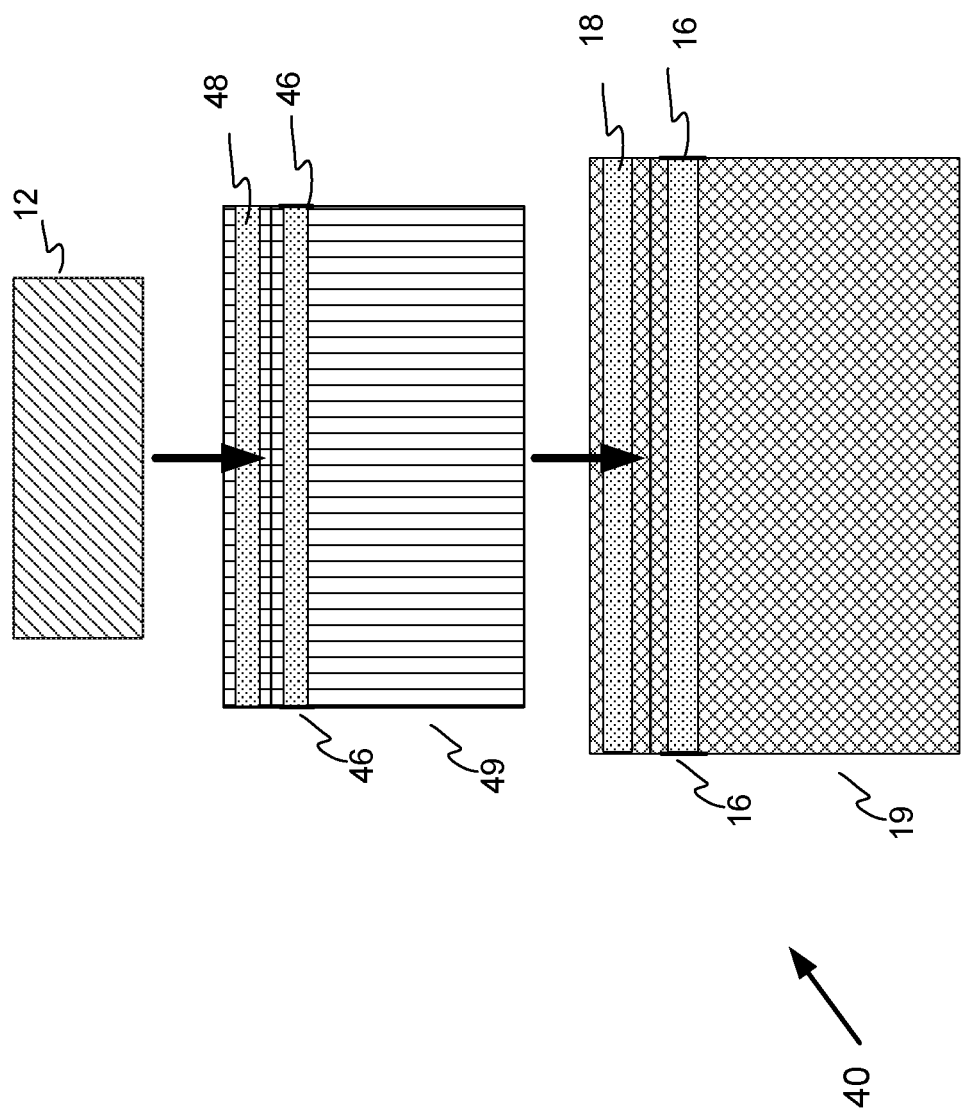
FIG. 3 illustrates a thermal runaway shield bag system of the present disclosure.

FIG. 3 illustrates another embodiment of the thermal runaway shield (TRS) shipping package of the present disclosure. The thermal runaway shield shipping package 40 includes at least one energy storage cell 12 wrapped inside an inner bag 49, and an outer bag 19 for receiving the inner bag 49. The inner bag 49 is fabricated from low-permeability film. The low-permeability film encloses elements for heat dissipation that includes water-based coolant, wicking mechanism to distribute coolant either in a woven or nonwoven configuration. The wicking material can be made from Nomex, Kevlar, carbon fiber veil, or other heat-resistant material. The inner bag 49 is a closable bag and includes fasteners 48 that can be folded to seal the inner bag 49. The fasteners 48 can be made of Velcro or other suitable sealing mechanism. In accordance to another embodiment of the present disclosure, slits 46 are located on the sides of the inner bag 49 to further enhance the permeability of the outer bag 49 during a thermal runaway event. The slits 46 can be fabricated from high temperature fiberglass material or other suitable material. The inner bag 49 can manage incidental gas venting as long as the gas venting is not excessive.

The outer bag 19 receives the wrapped inner bag 49. The outer bag 19 is fabricated from heat-resistant, permeable fabric that permits controlled release of gas from any thermal event. Materials such as Nomex, Kevlar, or other heat resistant material can be used to manufacture the outer bag 19. The outer bag 19 affords controlled release of gas but contains flame and ejecta that can be generated in a thermal runaway event. The outer bag 19 is a closable bag and includes fasteners 48 attached to the outer bag 19 that can be folded over to seal the inner bag 19. The fasteners 48 can be made of Velcro or other suitable sealing mechanism. Once sealed, the outer bag 19 can be further wrapped to form a wrapped package substantially shaped and larger than the unprotected unwrapped energy cells as the energy cells are now wrapped and protected in the TRS outer bag liners 14 and the outer bag 19. In accordance to another embodiment of the present disclosure, slits 16 are located on the sides of the outer bag 19 to further enhance the permeability of the outer bag 19 during a thermal runaway event. The slits 16 can be fabricated from high temperature fiberglass material or other suitable material that can withstand high temperatures.

Figure 4:
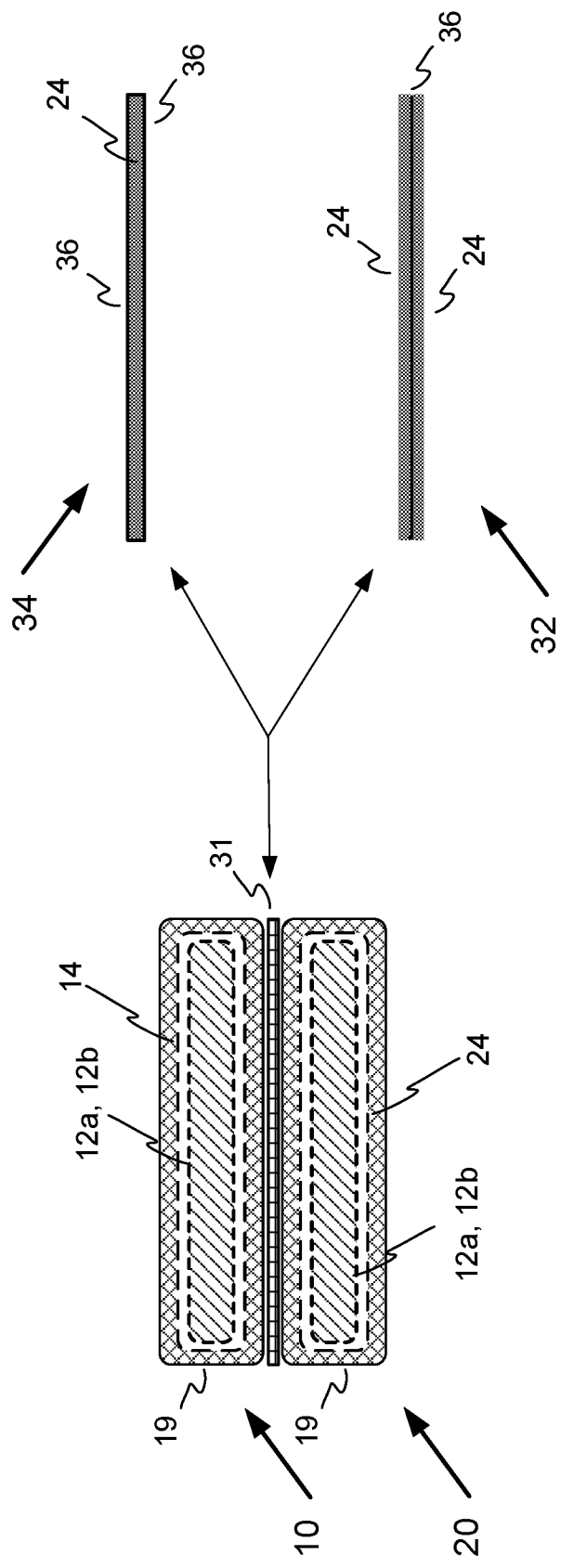
FIG. 4 illustrates an edge cross-sectional view of a thermal runaway shield shipping solution using a rigid thermal runaway shield and thermal runaway shield shipping packages of the present disclosure.

FIG. 4 illustrates an edge cross-sectional view of a thermal runaway shield shipping solution using a rigid thermal runaway shield and thermal runaway shield shipping package of the present disclosure. A first thermal runaway shield shipping package 10 of FIG. 1 is shown as the wrapped package substantially shaped and larger than the unwrapped and unprotected energy cells 12a, 12b. The first thermal runaway shield shipping package 10 encloses within the TRS outer bag 19 energy cells 12a, 12b, placed between two TRS outer bag flat liners 14 that are wrapped to form the first thermal runaway shield shipping package 10. A second thermal runaway shield shipping package 20 of FIG. 2 is shown as a wrapped package substantially shaped and larger than the unwrapped and unprotected energy cells 12a, 12b. The second thermal runaway shield shipping package 20 encloses within the TRS outer bag 19 energy cells 12a, 12b, each wrapped by a TRS flexible wrap 24 that are then wrapped by the outer bag 19 to form the second thermal runaway shield shipping package 20. A rigid thermal runaway shield assembly 31 separates the first thermal runaway shield shipping package 10 and the second thermal runaway shield shipping package 20. The rigid thermal runaway shield assembly 31 reduces heat transfer by blocking heat transfer through a rigid thermal runaway shield 36. Two embodiments of the rigid thermal runaway shield assembly 31 are illustrated in FIG. 4: a rigid exterior thermal runaway shield 34 and a pliable exterior thermal runaway shield 32.

In accordance to an embodiment of the present disclosure, the rigid exterior thermal runaway shield assembly 34 includes a pliable thermal runaway shield 24 core with a rigid thermal runaway shield 36 attached to each side of the pliable thermal runaway shield 24. The rigid thermal runaway shields 36 reduce heat transfer by blocking heat transfer through the rigid thermal runaway shields 36. Rigidity can be imparted to the pliable thermal runaway shield 24 by a thin sheet or sheets of phenolic/paper laminate or similar heat-resistant material. In accordance to an embodiment of the present disclosure, the rigid exterior thermal runaway shield assembly 34 includes a pliable thermal runaway shield 24 sandwiched between two rigid thermal runaway shields 36. A secure attachment of the rigid exterior thermal runaway shield assembly 34 can be achieved by means of pressure-sensitive adhesive, rivets, or a combination of adhesives and rivets. The pliable thermal runaway shield 24 core is fabricated from low-permeability film. The low-permeability film encloses elements for heat dissipation that includes water-based coolant, wicking mechanism to distribute coolant either in a woven or nonwoven configuration. The wicking material can be made from Nomex, Kevlar, carbon fiber veil, or other heat-resistant material.

In accordance to another embodiment of the present disclosure, the pliable exterior thermal runaway shield assembly 32 includes a rigid thermal runaway shield 36 with a pliable thermal runaway shield 24 attached to each face of the rigid thermal runaway shield 36. The rigid thermal runaway shield 36 reduces heat transfer by blocking heat transfer through the rigid thermal runaway shield 36. Rigidity can be imparted to the pliable thermal runaway shield 24 by a thin sheet or sheets of phenolic/paper laminate or similar heat-resistant material. In accordance to an embodiment of the present disclosure, the pliable exterior thermal runaway shield assembly 32 includes a rigid thermal runaway shield 36 sandwiched between two pliable thermal runaway shields 24. A secure attachment of the pliable exterior rigid thermal runaway shield assembly 32 can be achieved by means of pressure-sensitive adhesive, rivets, or a combination of adhesives and rivets. The pliable thermal runaway shield 24 is fabricated from low-permeability film. The low-permeability film encloses elements for heat dissipation that includes water-based coolant, wicking mechanism to distribute coolant either in a woven or nonwoven configuration. The wicking material can be made from Nomex, Kevlar, carbon fiber veil, or other heat-resistant material. During a thermal runaway incident, the water-based coolant is converted to a gaseous state as the coolant absorbs the heat generated in the thermal runaway incident. Moreover, the wicking mechanism can serve as a coolant reservoir for keeping the liquid in the affected area for converting the coolant to a gaseous state when adequate heat energy is released from the affected ESD cells.

Figure 5:
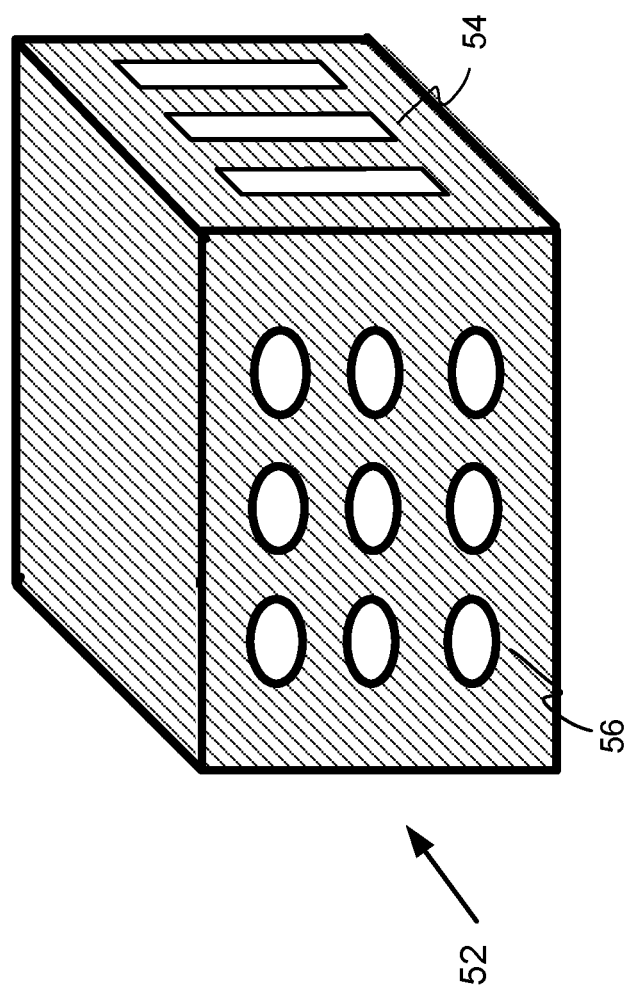
FIG. 5 illustrates a thermal runaway shield enclosure of the present disclosure.

FIG. 5 illustrates a thermal runaway shield enclosure of the present disclosure. The thermal runaway shield (TRS) enclosure 52 contains a thermal runaway incident of a Li-on or other type rechargeable battery. The TRS enclosure is a rigid case with openings 54, 56 on the sides of the enclosure to afford expansion gases an avenue to vent during a thermal runaway incident. The openings may be slits 54, holes 56, or other geometrically shaped openings. On the interior, the TRS enclosure 52 is lined with a permeable fabric that is strong, heat resistant and able to contain any debris and gases from a thermal runaway incident. The permeable fabric can be made of Kevlar or other material with similar properties.

In a further embodiment of the present disclosure, there is at least one divider that is substantially sized approximate to the enclosure base and is placed horizontally inside at the top and at the bottom of the TRS enclosure. The divider affords additional protection from expanding gases and debris during a thermal runaway incident. The divider can be flexible, rigid, or a combination. Referring to FIG. 4, the flexible divider can be at least one pliable TRS 24. In a further embodiment, the divider can be the rigid exterior TRS 34 that includes a pliable thermal runaway shield 24 core with a rigid thermal runaway shield 36 attached to each side of the pliable thermal runaway shield 24. In another embodiment, the divider can be a pliable exterior thermal runaway shield 32 that includes a rigid thermal runaway shield 36 with a pliable thermal runaway shield 24 attached to each face of the rigid thermal runaway shield 36.

While the present disclosure has been described with reference to certain preferred embodiments or methods, it is to be understood that the present disclosure is not limited to such specific embodiments or methods. Rather, it is the inventor's contention that the disclosure be understood and construed in its broadest meaning as reflected by the following claims. Thus, these claims are to be understood as incorporating not only the preferred methods described herein but all those other and further alterations and modifications as would be apparent to those of ordinary skill in the art.

We claim:

1. An apparatus for shipping or storage of Li-ion batteries comprising:
   a sealable outer bag fabricated from heat-resistant, permeable fabric;
   a first flexible thermal runaway shield ("TRS") fabricated from low-permeability film configured to line a first inside surface of the outer bag;
   a second flexible TRS fabricated from low-permeability film configured to line a second inside surface of the outer bag; and
   at least one Li-ion battery configured to be disposed between the first flexible TRS and the second TRS of the sealable outer bag to provide a sealed outer bag.

2. The apparatus of claim 1, wherein:
   the first flexible TRS is configured to wrap around a first Li-ion battery;
   the second flexible TRS is configured to wrap around a second Li-ion battery; and
   the sealable outer bag is configured to wrap around the first flexible TRS and the second TRS to provide a TRS sealed battery pack.

3. The apparatus of claim 1, wherein the sealable outer bag includes a slit on each side of the bag.

4. The apparatus of claim 1, wherein the sealable outer bag is made of aramid.

5. The apparatus of claim 1, wherein the flexible TRS is made of polyethylene terephthalate/aluminum foil laminated film.

6. The apparatus of claim 1, wherein the Li-ion battery is an 18650 rechargeable battery.

7. The apparatus of claim 2, wherein the flexible TRS includes a cavity to enclose elements for heat dissipation including water-based coolant.

8. The apparatus of claim 2, wherein the flexible TRS includes a cavity to enclose a heat spreader for heat dissipation.

9. The apparatus of claim 2, wherein the flexible TRS includes a cavity to enclose a carbon veil for heat dissipation.

10. The apparatus of claim 2 further comprising a rigid divider consisting of phenolic thermoset laminate substantially sized to separate the first flexible TRS from the second flexible TRS in the TRS sealed battery pack.

11. The apparatus of claim 10, wherein the rigid divider encloses a third flexible TRS fabricated from low-permeability film substantially sized as the rigid divider.

12. The apparatus of claim 10, wherein the rigid divider includes a third flexible TRS fabricated from low-permeability film substantially sized as the rigid divider configured to attach to one side of the rigid divider, and a fourth flexible TRS fabricated from low-permeability film substantially sized as the rigid divider configured to attach to another side of the rigid divider.

13. An apparatus for shipping or storage of Li-ion batteries comprising:
a sealable flexible thermal runaway shield ("TRS") bag fabricated from low-permeability film configured to store at least one Li-ion battery; and
a sealable outer bag fabricated from heat-resistant, permeable fabric configured to store the sealable flexible TRS bag.

14. The apparatus of claim 13, wherein the sealable flexible TRS bag is made of polyethylene terephthalate/ aluminum foil laminated film and includes a second low-permeability film forming a cavity.

15. The apparatus of claim 13, wherein the sealable outer bag is made of aramid.

16. The apparatus of claim 13, wherein the sealable outer bag includes a slit on each side of the bag.

17. The apparatus of claim 13, wherein the flexible TRS bag includes a second low-permeability film forming a cavity to enclose elements for heat dissipation including water-based coolant.

18. The apparatus of claim 13, wherein the flexible TRS bag includes a second low-permeability film forming a cavity to enclose a heat spreader for heat dissipation.

19. The apparatus of claim 13, wherein the flexible TRS bag includes a second low-permeability film forming a cavity to enclose a carbon veil for heat dissipation.

20. An apparatus for shipping or storage of Li-ion batteries comprising:
a sealable outer bag fabricated from heat-resistant, permeable fabric;
a first flexible thermal runaway shield ("TRS") fabricated from low-permeability film configured to line a first inside surface of the outer bag;
a second flexible TRS fabricated from low-permeability film configured to line a second inside surface of the outer bag;
a rigid divider configured to separate an interior of the sealable outer bag into a first compartment and a second compartment;
a first sealable flexible TRS bag fabricated from low-permeability film configured to enclose at least one Li-ion battery within a first compartment of the sealable outer bag; and
a second sealable flexible TRS bag fabricated from low-permeability film configured to enclose at least one other Li-ion battery within a second compartment of the sealable outer bag.

21. The apparatus of claim 20, wherein the sealable outer bag includes a slit on each side of the bag.

22. The apparatus of claim 20 further comprising a third flexible TRS substantially size as the rigid divider fabricated from low-permeability film, wherein the rigid divider includes a cavity configured to enclose a third flexible TRS.

23. The apparatus of claim 20 further comprising a third flexible TRS substantially sized as the rigid divider fabricated from low-permeability film and a fourth flexible TRS substantially sized as the rigid divider fabricated from low-permeability film, wherein the third flexible TRS and the fourth flexible TRS is attached to each side of the rigid divider.

* * * * *